(12) United States Patent
Waid

(10) Patent No.: US 7,724,184 B2
(45) Date of Patent: May 25, 2010

(54) SYSTEM AND METHOD FOR DETECTING FALSE NAVIGATION SIGNALS

(75) Inventor: James D. Waid, Bradenton, FL (US)

(73) Assignee: Honeywell International Inc., Morristown, NJ (US)

( * ) Notice: Subject to any disclaimer, the term of this patent is extended or adjusted under 35 U.S.C. 154(b) by 646 days.

(21) Appl. No.: 11/358,585

(22) Filed: Feb. 21, 2006

(65) Prior Publication Data

US 2007/0194984 A1 Aug. 23, 2007

(51) Int. Cl.
*G01S 1/00* (2006.01)
(52) U.S. Cl. .................................. 342/357.02
(58) Field of Classification Search ...............................
342/357.01–357.17, 450, 457, 458, 431, 342/462, 463; 701/213, 214, 216
See application file for complete search history.

(56) References Cited

U.S. PATENT DOCUMENTS

| | | | | | |
|---|---|---|---|---|---|
| 5,557,284 | A | * | 9/1996 | Hartman | 342/357.03 |
| 5,760,737 | A | * | 6/1998 | Brenner | 342/357.02 |
| 6,127,968 | A | * | 10/2000 | Lu | 342/357.03 |
| 6,445,344 | B1 | * | 9/2002 | Wise et al. | 342/458 |
| 7,471,238 | B2 | * | 12/2008 | Lillo et al. | 342/357.02 |
| 2001/0020216 | A1 | * | 9/2001 | Lin | 701/216 |
| 2002/0128775 | A1 | * | 9/2002 | Brodie et al. | 701/216 |
| 2002/0158796 | A1 | * | 10/2002 | Humphrey et al. | 342/357.14 |
| 2002/0169550 | A1 | * | 11/2002 | Perlmutter et al. | 701/213 |
| 2002/0177950 | A1 | * | 11/2002 | Davies | 701/213 |
| 2004/0234008 | A1 | * | 11/2004 | Diggelen et al. | 375/343 |
| 2006/0103573 | A1 | * | 5/2006 | Geier et al. | 342/357.02 |
| 2007/0096978 | A1 | * | 5/2007 | van Diggelen et al. | 342/357.02 |

* cited by examiner

*Primary Examiner*—Thomas H Tarcza
*Assistant Examiner*—Nga X Nguyen
(74) *Attorney, Agent, or Firm*—Fogg & Powers LLC

(57) ABSTRACT

A system and method for detecting and excluding false GPS signals are disclosed, which predict a GPS measurement value with a high degree of confidence, compare the predicted value with measured values, and reject a false measurement based on the comparison results. As one example, a tightly coupled GPS/Inertial Navigation System (GPS/INS) is disclosed, which uses a Kalman filter for comparison of a predicted GPS measurement value with measured values (e.g., the residuals) to form the basis for the rejection of false measurements. This rejection is referred to as a chi-squared reject, and can be extended in time in order to apply the same test to a reacquired signal following the loss of an original validated GPS signal. The Kalman filter propagates the receiver's clock bias rate, and enables the system to predict the GPS measurements at the time of reacquisition. The residuals are compared to a limit defined by the uncertainties of the prediction and the measurement errors expected to be involved.

20 Claims, 3 Drawing Sheets

SYSTEM AND METHOD FOR DETECTING FALSE NAVIGATION SIGNALS

FIELD OF THE INVENTION

The present invention relates generally to the navigation field, and more specifically, but not exclusively, to a system and method for detecting false navigation signals such as, for example, false Global Positioning System (GPS) signals.

BACKGROUND OF THE INVENTION

The GPS is a constellation of 24 earth-orbiting radio-navigation satellites whose orbits are arranged so that at least four of the satellites are visible anywhere on the Earth at any time. A GPS receiver receives signals from four or more of these satellites, and uses trilateration techniques to determine the precise position (e.g., altitude, and latitudinal and longitudinal coordinates) of the receiver on or near the Earth. Also, using the received signals, a GPS receiver computes velocity and time. Thus, GPS receivers are used to provide precise position, velocity and time information for users that include, but are not limited to, aircraft, missiles, ships, ground-based vehicles, fixed based systems, and individuals (e.g., using hand-held GPS receivers). For certain applications, differential GPS (DGPS) is used to eliminate measurement errors and improve the accuracies of the basic GPS derived position, velocity and time estimates.

A significant problem with existing GPS receivers is that they are subject to jamming and spoofing. Jamming is the intentional or unintentional denial of the signal to the user, typically through radio frequency interference (RFI). Spoofing is a surreptitious attempt (by an unfriendly party) to feed a GPS receiver false information so that the GPS receiver computes an erroneous position, velocity, and/or time. In a typical spoofing scenario, a GPS signal is received from a satellite and retransmitted with a higher power than that of the original signal in space. This indirect, deceptive GPS signal is received by a GPS receiver, which produces an inaccurate estimate of position, velocity and time, as a result. The deceptive GPS signal(s) can be derived from a retransmission of a single satellite's signal, retransmissions of a small number of satellites' signals, or retransmissions of signals from the entire visible constellation of satellites. The original, direct GPS signal can be overcome by a signal from an RF jamming device, or by the power of the indirect retransmitted signal itself. As such, spoofing has been identified by the GPS community as a viable threat. Therefore, a pressing need exists for a system that can detect and exclude false GPS signals. As described in detailed below, the present invention provides a system and method for detecting and excluding false GPS signals, which resolve the above-described spoofing problems and other related problems.

SUMMARY OF THE INVENTION

The present invention provides a system and method for detecting and excluding false GPS signals, by predicting a GPS measurement value with a high degree of confidence, comparing the predicted value with measured values, and rejecting a false measurement based on the comparison results. In accordance with a preferred embodiment of the present invention, a tightly coupled GPS/Inertial Navigation System (GPS/INS) is provided, which uses a Kalman filter for comparison of a predicted GPS measurement value with measured values (e.g., the residuals) to form the basis for the rejection of false measurements. This rejection is referred to as a chi-squared reject, and can be extended in time in order to apply the same test to a reacquired signal following the loss of an original GPS signal. The Kalman filter propagates the receiver's clock bias rate, and enables the system to predict the GPS measurements at the time of reacquisition. The residuals are compared to a limit defined by the uncertainties of the prediction and the measurement errors expected to be involved.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
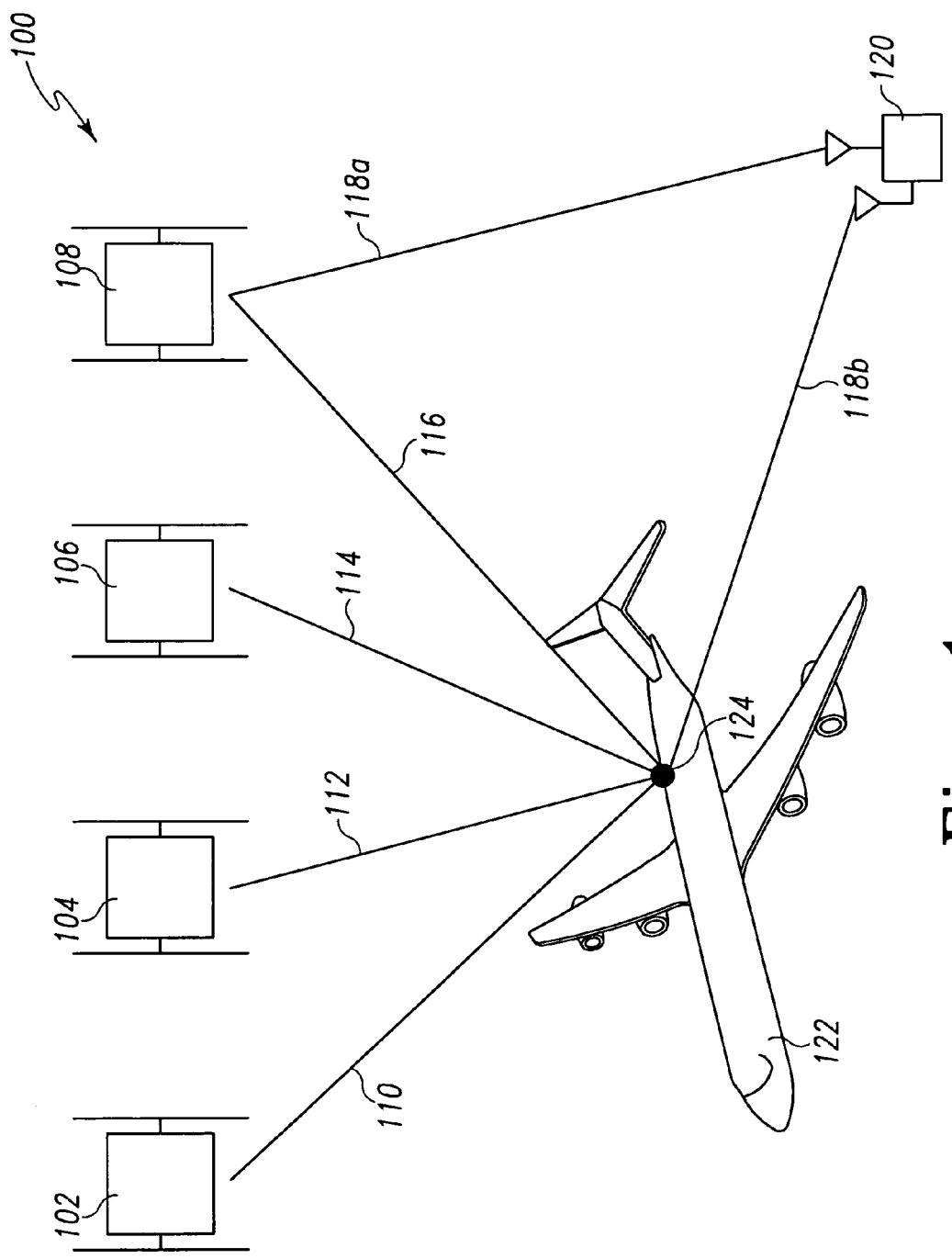
FIG. 1 depicts a pictorial representation of an example system for detecting false satellite navigation signals, in accordance with a preferred embodiment of the present invention.

With reference now to the figures, FIG. 1 depicts a pictorial representation of an example system 100 for detecting false satellite navigation signals, in accordance with a preferred embodiment of the present invention. Notably, the satellite navigation system signals described for this example embodiment are GPS signals, but the present invention is not intended to be so limited and can include within its scope signals from other types of radio-navigation systems (e.g., GBAS, GNSS, etc.). For this example embodiment, system 100 includes a plurality of radio-navigation satellites 102, 104, 106, 108. For clarity, only four satellites are shown, but it should be understood that existing and future satellite navigation systems can include more than four satellites visible at any time. Each satellite 102, 104, 106, 108 includes a transmitter, which transmits a respective navigation signal 110, 112, 114, 116. System 100 also includes a satellite navigation receiver 124, which receives and processes navigation signals 110, 112, 114 and 116. As shown, satellite navigation receiver 124 is located in an airborne vehicle (e.g., aircraft) 122. However, it should be understood that a satellite navigation receiver (124) can also be located in other types of vehicles, such as, for example, ships, ground-based vehicles (e.g., buses, trucks, automobiles, etc.), missiles, spacecraft, and also in hand-held devices. Also, for illustrative purposes and simplicity, the navigation signals 110, 112, 114 and 116 in FIG. 1 are shown as single signals. However, actual satellite navigation signals are typically encoded, complex multiple signals, but those features do not have to be shown herein in order to explain principles of the present invention.

For this illustrative embodiment, system 100 also includes a receiver/transmitter 120, which receives any or all navigation signal(s) (e.g., 118a) transmitted by any or all of the satellite(s) (102, 104, 106, 108) (e.g., 108), possibly delays and amplifies (and/or otherwise processes) the received navigation signal(s), and re-transmits the navigation signal 118b. As shown, receiver/transmitter 120 is being used (e.g., by an unfriendly party) to conduct a spoofing on satellite navigation receiver 124 in aircraft 122, by re-transmitting a false or deceptive navigation signal 118b intended to be received by navigation receiver 124. Notably, although receiver/transmitter 120 is shown re-transmitting one false navigation signal 118b, it should be understood that such a receiver/transmitter can be used to re-transmit false navigation signals based on navigation signals received from one or more of the other satellites in the constellation of navigation satellites involved. Also, receiver/transmitter 120 can be located on any suitable platform on the ground, at sea, in airspace, or in space.

Figure 2:
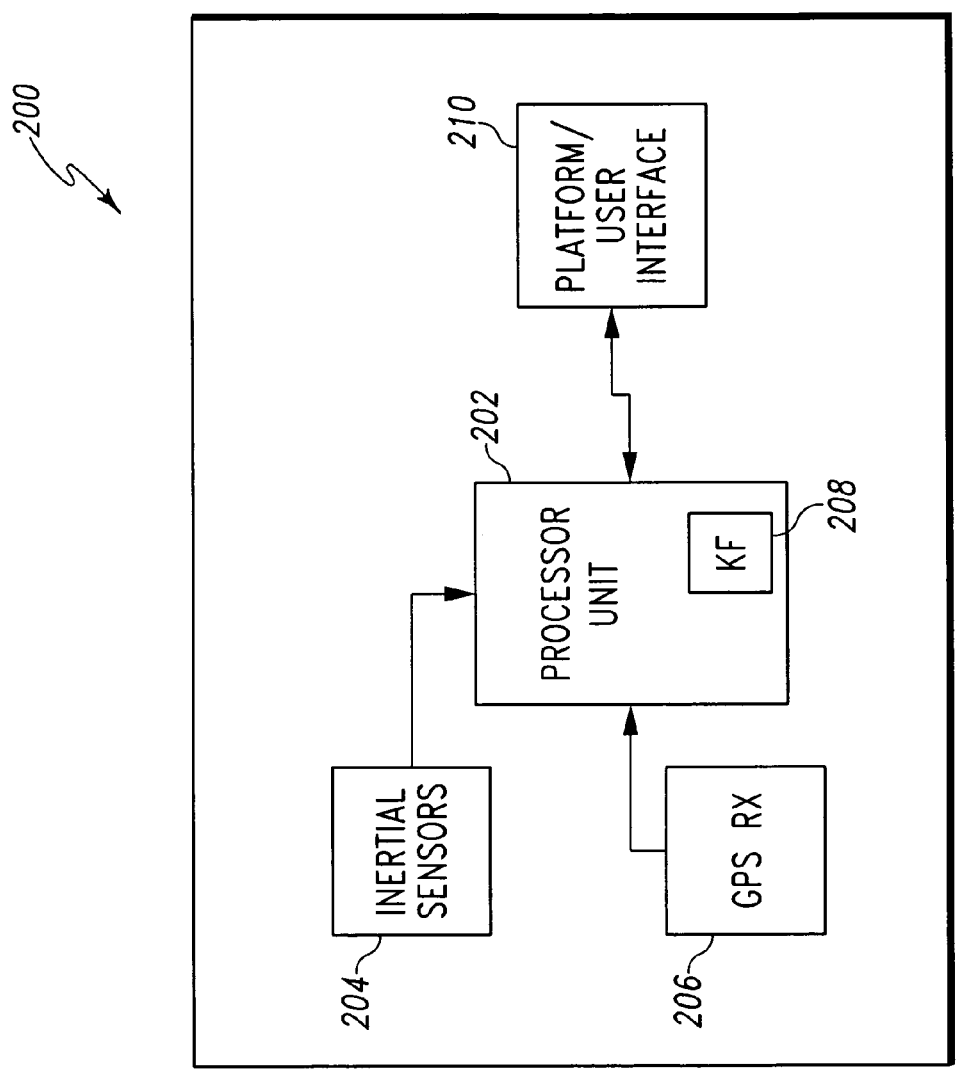
FIG. 2 depicts a block diagram of an example system for detecting false navigation signals, which can be used to implement a preferred embodiment of the present invention.

FIG. 2 depicts a block diagram of an example system 200 for detecting false navigation signals, which can be used to implement a preferred embodiment of the present invention. For example, system 200 includes the navigation receiver 124 shown in FIG. 1. For this example embodiment, system 200 is preferably an integrated GPS/INS system, which can be implemented using, for example, an H-764 Advanced Configurable Embedded GPS/INS (EGI) or H-764 ACE Navigation System produced by Honeywell International, Inc.

As shown, for this example embodiment, system 200 includes a digital processor unit 202, and a plurality of inertial navigation sensors 204 (e.g., three linear accelerometers, three rate gyroscopes, and one altimeter) that measure acceleration (e.g., specific force), rotational rates, and altitude information to processor unit 202. Processor unit 202 executes one or more suitable algorithms (e.g., stored in local memory as software instructions) and produces position, velocity and attitude information from the inertial sensor data received. System 200 also includes a GPS receiver 206, which receives navigation signals from a plurality of GPS satellite transmitters. For example, GPS receiver 206 could be receiving navigation signals 110, 112, 114 and 116 from the respective transmitters of satellites 102, 104, 106 and 108 in FIG. 1. As such, each received GPS signal indicates to processor unit 202 the position of the respective GPS transmitter and its transmission time. GPS receiver 206 includes an internal clock, which enables the GPS receiver to approximate the signal transit times and estimate the distances to the transmitters involved. Processor 202 uses at least four of these distances (e.g., commonly referred to as pseudoranges) to approximate the position of GPS receiver 206. Thus, processor unit 202 uses both the INS and GPS navigation data to determine the position, speed and attitude of the host vehicle (e.g., aircraft 122 in FIG. 1) with a relatively high degree of accuracy. This navigation information can be provided to a platform or user interface 210 coupled to processor unit 202, and eventually presented to a user via a display unit.

For this example embodiment, system 200 also includes a Kalman filter 208 for detecting one or more false satellite navigation signals (if such deceptive signals are received). For example, Kalman filter 208 can be used for detecting one or more retransmitted GPS signals, such as false navigation signal 118b shown in FIG. 1. Essentially, a Kalman filter is an efficient recursive filter (e.g., executed as software instructions by a digital processor), which can estimate the state of a dynamic system from a series of measured parameters, remove the effects of noise in the measurements, and provide a very accurate estimate of the parameters at the present time, at a future time, or at a time in the past. As such, for this example embodiment, an algorithm for Kalman filter 208 is executed within the processor unit 202 to predict a GPS measurement at a future time, compare the predicted measurement with measurement data received at that time, and use the comparison to determine if the received measurement information is valid or false. Also, this approach can be used to test reacquired GPS signals following the loss of an original GPS signal, by using Kalman filter 208 to propagate the user system's clock bias rate, position and velocity, and enabling the Kalman filter to predict the GPS signals (i.e., measurement) at the time of reacquisition. For this example embodiment, the residuals (predicted differenced with the measured values) are compared to a predetermined limit defined by the uncertainties of the prediction and the expected measurement errors involved.

For this example embodiment, Kalman filter 208 can be expressed (in general terms) by the following set of equations:

$$x^-(t) = \Phi x^+(t-1)$$

$$P^-(t) = \Phi P^+(t-1)\Phi^T + Q$$

$$K = P^-(t)H^T(HP^-(t)H^T + R)^{-1}$$

$$P^+(t) = (I - KH)P^-(t)$$

$$y = (Z_{INS} - Z_{meas}) - Hx^-(t)$$

$$x^+(t) = x^-(t) + Ky$$

where x represents the error states for the model, P represents the error covariance matrix, Z represents the measurement vector, y represents the measurement residual, H represents the data matrix transitions from error state to measurement space, K represents the Kalman filter gain, R represents the measurement noise covariance, $\Phi$ represents the state transition matrix, and Q represents the system covariance matrix. Note that a superscript $^+$ denotes a calculated value, and a superscript $^-$ denotes a predicted value.

For this example embodiment, processor unit 202 executes Kalman filter 208 (as expressed directly above) to model the following error state elements and generate a blended navigation solution:

TABLE 1

Error State Elements - Fine Mode

| Symbol | Number of elements | Description |
| --- | --- | --- |
| $\delta w$ | 3 | integrated velocity error |
| $\xi$ | 3 | position error |
| $\zeta$ | 3 | pseudo velocity error |
| $\psi$ | 3 | inertial alignment error |
| $\delta b^{clock}$ | 1 | GPS clock bias |
| $\delta \gamma\, af$ | 3 | gyro bias error |
| $\delta d^{clock}$ | 1 | GPS clock drift |
| $\delta b^{baro}$ | 2 | baro altimeter bias and scale factor error |
| $\delta a$ | 6 | accel bias & scale factor error |
| $\frac{g}{}$ | 3 | gravity deflection and anomaly error |
| $b^{PR}$ | 10 | GPS range bias |
| $b^{DR}$ | 10 | GPS delta range bias |
| $\delta \gamma\, af$ | 6 | gyro scale factor & non-orthogonality error |

Using the above-described Kalman filter prediction approach, invalid or false GPS measurements can be detected (and excluded) by evaluating the residuals (predicted differenced with the measured values) for the GPS pseudorange measurements and delta range measurements received by GPS receiver 206. As such, a threshold limit that can be used for accepting the received GPS measurement data is as follows:

Acceptance criteria for measured data=$L(HP^-H^T+R)$, where L is a scalar with a value selected to ensure a predetermined probability. This probability is driven by an acceptable risk as determined by a user. Thus, if a reacquired signal does not meet the above-described acceptance criteria, then the associated measurement data is assumed to be false and not accepted into a blended navigation solution.

Figure 3:
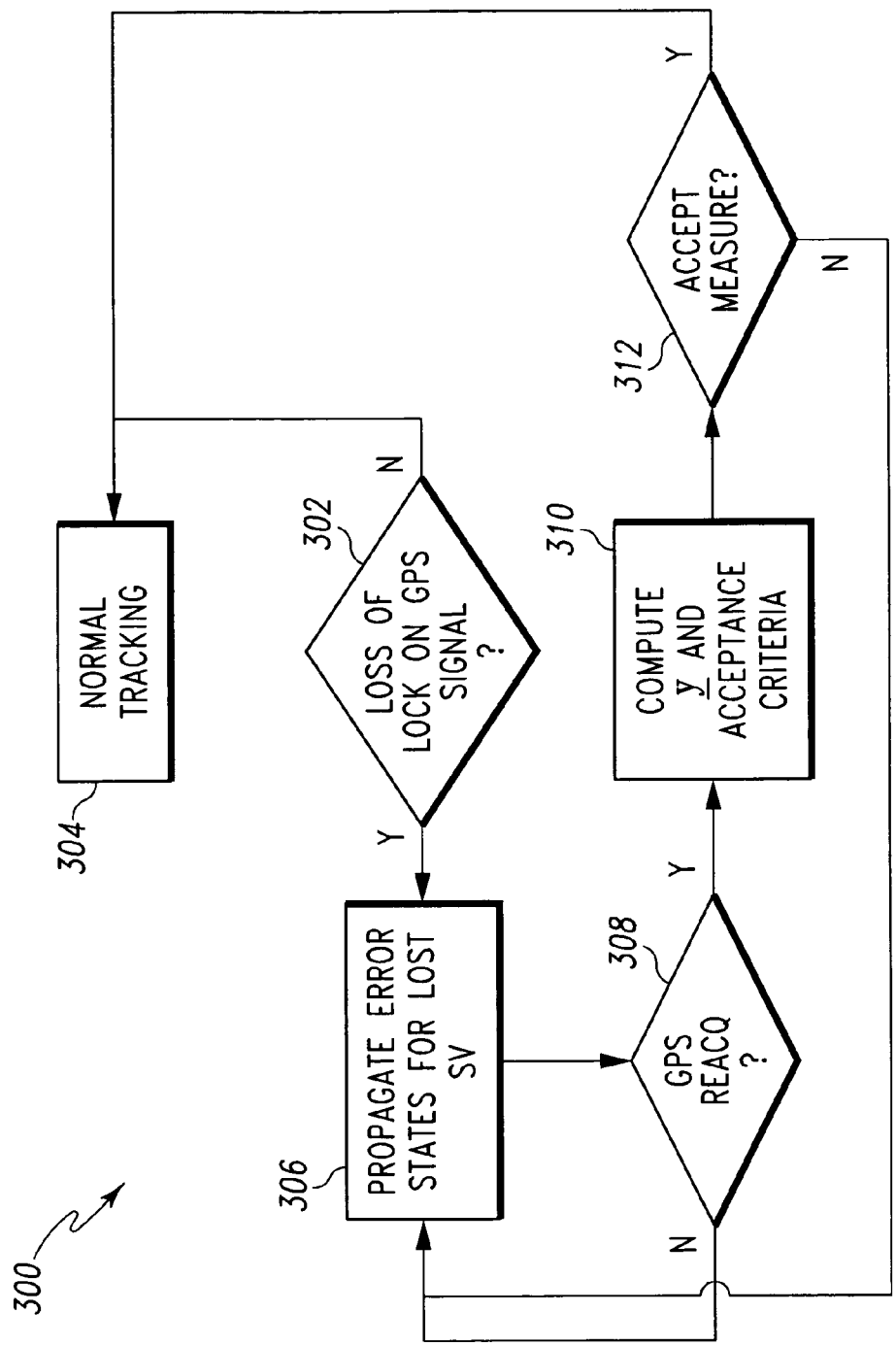
FIG. 3 depicts an example method for detecting and excluding false reacquired navigation signals, in accordance with a preferred embodiment of the present invention.

FIG. 3 depicts an example method 300 for detecting and excluding false reacquired navigation signals, in accordance with a preferred embodiment of the present invention. Referring to FIGS. 2 and 3 for this example embodiment, method 300 begins by processor unit 202 determining whether or not GPS receiver 206 has lost a lock on a signal acquired from a GPS transmitter (step 302). For example, processor unit 202 can make this determination by monitoring a suitable acquisition signal (or the level of the actual navigation signal) received from GPS receiver 206. If GPS receiver 206 has not lost a lock on a transmitted signal, then processor unit 202 takes no action, and GPS receiver 206 continues to track the navigation signals being received (step 304). However, if (at step 302) processor unit 202 determines that GPS receiver 206 has lost a lock on a transmitted signal, then processor unit 202 uses Kalman filter 208 to predict and propagate the error states for the lost signal involved. Processor unit 202 then monitors GPS receiver 206 to determine whether or not the lost navigation signal is reacquired (step 308). If not, the method returns to step 306, and processor unit 202 continues (with Kalman filter 208) to propagate the error states for the lost navigation signal involved.

If (at step 308) processor unit 202 determines that the lost navigation signal has been reacquired, then processor unit 202 uses Kalman filter 208 to compute the residual value (y) and the above-described acceptance criteria for the GPS measurement(s) involved (step 310). Based on the acceptance criteria used, processor unit 202 then determines whether or not to accept the measurement involved (step 312). If the measurement meets the acceptance criteria, then processor unit 202 assumes that the reacquired navigation signal is not a false signal, and accepts the GPS receiver 206 measurements of the tracked signal (i.e., returns to step 304). However, if (at step 312) processor unit 202 determines that the measurement does not meet the acceptance criteria, then processor unit 202 assumes that the reacquired signal is a false signal, rejects the measurement data from the associated satellite, and the method returns to step 306. Notably, the present invention provides the ability to continue to estimate the predicted GPS measurements and the associated error states during the period while the GPS signal is not being tracked and/or accepted by the navigation processor. Once the GPS signal is reacquired, each measurement received can be evaluated on a satellite-by-satellite basis.

It is important to note that while the present invention has been described in the context of a fully functioning system for detecting false navigation signals, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular system for detecting false navigation signals.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A system for detecting a false navigation signal, comprising:
   a navigation receiver, said navigation receiver operable to receive a plurality of navigation signals; and
   a processor unit coupled to said navigation receiver, said processor unit operable to:
   execute a recursive filter to predict a parameter associated with at least one navigation signal of said plurality of navigation signals responsive to a loss of lock on and a subsequent reacquisition of the at least one navigation signal of said plurality of navigation signals;
   receive a measurement value associated with said at least one lost and reacquired navigation signal;
   compare said measurement value with said predicted parameter; and
   responsive to a result of said comparison, determine if said at least one lost and reacquired navigation signal is a false navigation signal.

2. The system of claim 1, wherein said navigation receiver is a satellite navigation receiver.

3. The system of claim 1, wherein said navigation receiver is a GPS receiver.

4. The system of claim 1, wherein said false navigation signal comprises a time delayed version of a valid navigation signal.

5. The system of claim 1, wherein said false navigation signal comprises a retransmitted navigation signal.

6. The system of claim 1, wherein said recursive filter comprises a Kalman filter.

7. The system of claim 1, wherein said plurality of navigation signals comprises a plurality of signals transmitted from a plurality of radio-navigation satellites.

8. The system of claim 1, wherein the operation to compare said measurement value with said predicted parameter comprises comparing said measurement value to a predetermined acceptance criteria.

9. The system of claim 1, wherein said measurement value comprises a residual value for at least one of a GPS pseudo-range value and a GPS delta range value.

10. The system of claim 1, wherein said predicted parameter comprises at least one error state associated with a predicted measurement value.

11. A system for detecting a deceptive navigation signal, comprising:
    means for receiving a plurality of navigation signals;
    means for executing a recursive filter to predict a parameter associated with at least one navigation signal of said plurality of navigation;
    means for receiving a measurement value associated with at least one navigation signal;
    means for comparing said measurement value with said predicted parameter; and means for determining if said at least one navigation signal is a deceptive navigation signal, responsive to a comparison performed with said means for comparing.

12. The system of claim 11, wherein said means for receiving a plurality of signals is a satellite navigation receiver.

13. The system of claim 11, wherein said means for receiving a plurality of navigation signals is a GPS receiver.

14. The system of claim 11, wherein said deceptive navigation signal comprises a time delayed and amplified version of a valid navigation signal.

15. The system of claim 11, wherein said deceptive navigation signal comprises a retransmitted GPS signal.

16. A method for detecting a false navigation signal, comprising the steps of:
   receiving a plurality of navigation signals;
   executing a recursive filter to predict a parameter associated with at least one navigation signal of said plurality of navigation signals, responsive to a loss of lock on and a subsequent reacquisition of the at least one navigation signal of said plurality of navigation signals;
   receiving a measurement value associated with said at least one lost and reacquired navigation signal;
   comparing said measurement value with said predicted parameter; and
   determining if said at least one lost and reacquired navigation signal is a false navigation signal, responsive to the comparing step.

17. The method of claim 16, wherein the step of receiving a plurality of signals is performed with a satellite navigation receiver.

18. The method of claim 16, wherein the step of comparing said measurement value with said predicted parameter comprises a step of comparing said measurement value to a predetermined acceptance criteria.

19. A computer program product, comprising:
   a computer-usable medium having computer-readable code embodied therein for configuring a computer processor, the computer program product comprising:
   a first executable computer-readable code configured to cause a computer processor to cause a navigation receiver to receive a plurality of navigation signals;
   a second executable computer-readable code configured to cause a computer processor to execute a recursive filter to predict a parameter associated with at least one navigation signal of said plurality of navigation;
   a third executable computer-readable code configured to cause a computer processor to receive a measurement value associated with said at least one navigation signal;
   a fourth executable computer-readable code configured to cause a computer processor to compare said measurement value with said predicted parameter; and
   a fifth executable computer-readable code configured to cause a computer processor to determine if said at least one navigation signal is a deceptive navigation signal, responsive to an execution of said fourth executable computer-readable code.

20. The computer program product of claim 19, wherein said recursive filter comprises a Kalman filter.

* * * * *